United States Patent [19]
Reynolds

[11] Patent Number: 5,927,136
[45] Date of Patent: Jul. 27, 1999

[54] METHOD OF TREATING A TUBULAR MEMBER

[76] Inventor: David L. Reynolds, 305 Knowlton Rd., P.O. Box 600, Lac Brome, Quebec, Canada, JOE 1VO

[21] Appl. No.: 08/964,691

[22] Filed: Nov. 6, 1997

[51] Int. Cl.[6] .................................................. B21D 28/10
[52] U.S. Cl. ........................................... 72/325; 29/623.1
[58] Field of Search .............................. 72/325, 123, 117, 72/703; 29/623.1; 429/164

[56] References Cited

U.S. PATENT DOCUMENTS

| | | | |
|---|---|---|---|
| 3,753,364 | 8/1973 | Runyan | 72/325 |
| 4,194,384 | 3/1980 | Fujie | 72/325 |
| 5,376,410 | 12/1994 | MacKelvie | 427/290 |
| 5,553,476 | 9/1996 | Oehy | 72/325 |

FOREIGN PATENT DOCUMENTS 1337622  11/1995  Canada .

Primary Examiner—Daniel C. Crane
Attorney, Agent, or Firm—Ridout & Maybee

[57] ABSTRACT

The internal tubular surface of a collector can for a battery cell is processed by planing or ploughing an array of discrete portions of material out of the thickness of the can wall without penetrating the can so as to lift these portions inwardly of the surfaces, while leaving them attached to the can, to positions where they present surfaces facing both towards and away from the can. The lifted portions extend the internal surface of the can and provide couples into the active material of the cell which both physically and electrically bond the material to the extended surface. The process makes use of a segmental array of cutting elements advanced axially into the can, then moved radially to penetrate the can surface and axially or circumferentially through a cutting stroke to raise non-detached shavings on a segment of the internal surface of the can, and then withdrawn using reverse motions. Multiple segmental arrays may be used simultaneously, or the same array may be used sequentially on different segments of the surface.

11 Claims, 4 Drawing Sheets

METHOD OF TREATING A TUBULAR MEMBER

FIELD OF THE INVENTION

This invention relates to a method of treating the internal tubular surface of a tubular member, and more particularly to a method of treating the internal surface of a can for use as a collector in a battery cell, such as an alkaline battery cell.

BACKGROUND OF THE INVENTION

In a typical alkaline-manganese battery cell, the battery comprises a current collector in the form of a cylindrical metal can, a manganese dioxide electrode contacting the inner surface of the can, a zinc axial electrode cladding an axial current collector or "nail" and an electrolyte between the electrodes. The manganese dioxide is blended with graphite to produce an electrical conductive material and to enable current to be collected through the can.

For electrical current to pass readily between the can and the active material of the adjacent electrode, the material must maintain good contact over as large an area as possible with the internal tubular surface of the can forming the collector. However, a problem associated with prior art battery cells is inadequate mechanical and electrical coupling between the active material and the collector. As the internal tubular surface of the first electrode is essentially smooth, any failure to maintain tight contact between the collector and the active material for any of a variety of reasons, will increase the internal resistance of the cell. Attempts have been made to improve the area and reliability of contact between the collector and the active material by abrading, knurling or otherwise texturizing the surface of the collector but these provide only modest improvements in the area and reliability of contact.

SUMMARY OF THE INVENTION

It is an object of this invention to provide a technique for economically improving the coupling between a collector and active material contained by the collector and forming an electrode of a battery cell, by forming transition zone of finite depth between the internal surface of the tubular member and the active material within which the active material is mechanically and electrically bonded to the collector. In particular, it an object of this invention to provide a process for treating the internal tubular surface of a collector for use in a battery cell, whereby the nature and area of contact between the collector and active material is modified so as to provide enhanced mechanical and electrical couplings between them.

The invention provides a process for treating an internal tubular surface of a tubular collector can for a battery cell formed of conductive ductile material, the process comprising, for each of plural segments of the internal tubular surface, performing an operating cycle comprising moving a segmental array of radially outward extending cutting elements axially into the can; moving the tool radially outwards to drive the cutting elements into the material that segment of said tubular surface without penetrating through the can, and driving the tool through a cutting stroke having at least one of axial and rotational components such that the cutting elements raise discrete portions of the material of the collector out of said surface, to positions presenting additional surfaces facing both towards and away from said internal tubular surface, without detaching said portions from the surface; and withdrawing the tool from the collector without detaching said discrete portions.

The invention also extends to apparatus for carrying out the process.

The portions raised from the internal tubular surface of the tubular member, and the recesses from which the displaced portions are displaced, increase the surface area of the internal tubular surface of the member and also provide a transition zone of finite depth between the internal tubular surface and any internally adjacent material within which the raised portion present auxiliary surfaces facing both towards and away from the tubular surface, thus ensuring a mechanical bond with the active material and the formation of an array of electrical couples extending into the active material within the transition zone. In contrast to prior art battery electrodes, where most of the contact area between the paste and the tubular electrode is only along the internal tubular surface of the electrode, much of the contact area in electrodes produced by this invention will be along the plurality of the raised portions extending from the internal tubular surface of the electrode. The opposed surfaces of these portions ensure the maintenance of good mechanical contact and thus good electrical coupling which reduces the internal resistance of the battery cell. Any forces tending to separate the active material from the collector will be resisted.

This invention is also advantageous in that it can be used with pre-formed tubular metal collector cans. Effective application of the invention requires the can material to be ductile, but this is a necessary quality of stock used for the deep drawing of cans. As a result, the invention provides the possibility of significantly increasing the efficiency of production of mass-produced battery cells without greatly increasing manufacturing costs. As the invention can use either a rotational and/or an axial cutting stroke, the invention is also advantageous in that it can be readily adapted for use in a variety of assembly line environments. Furthermore, once a tool for performing the method of this invention is fabricated, the amount of material displaced from the internal tubular surface of the collector can be precisely controlled for each battery cell produced. As a result, the process can be applied in a consistent manner.

DESCRIPTION OF THE PREFERRED EMBODIMENTS

Figure 1:
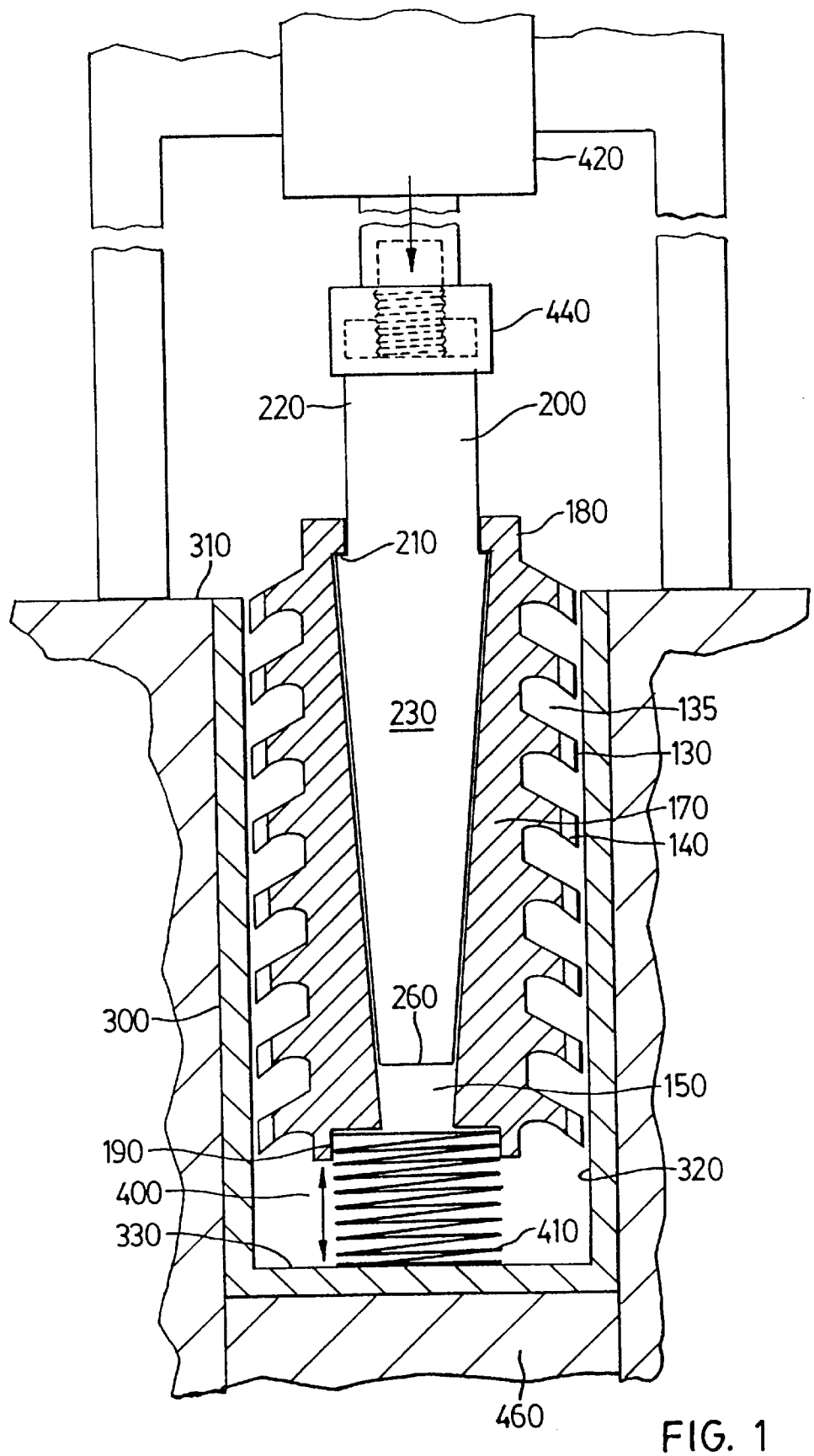
FIG. 1 is a schematic sectional view of a first embodiment of apparatus for performing the process of the invention, showing a tool inserted in a collector can.
Figure 2:
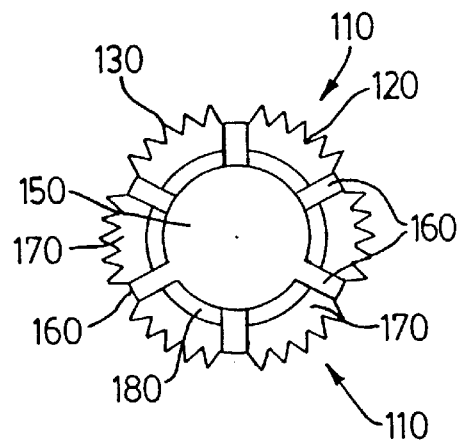
FIG. 2 is an end view of the tool depicted in FIG. 1.
Figure 3:
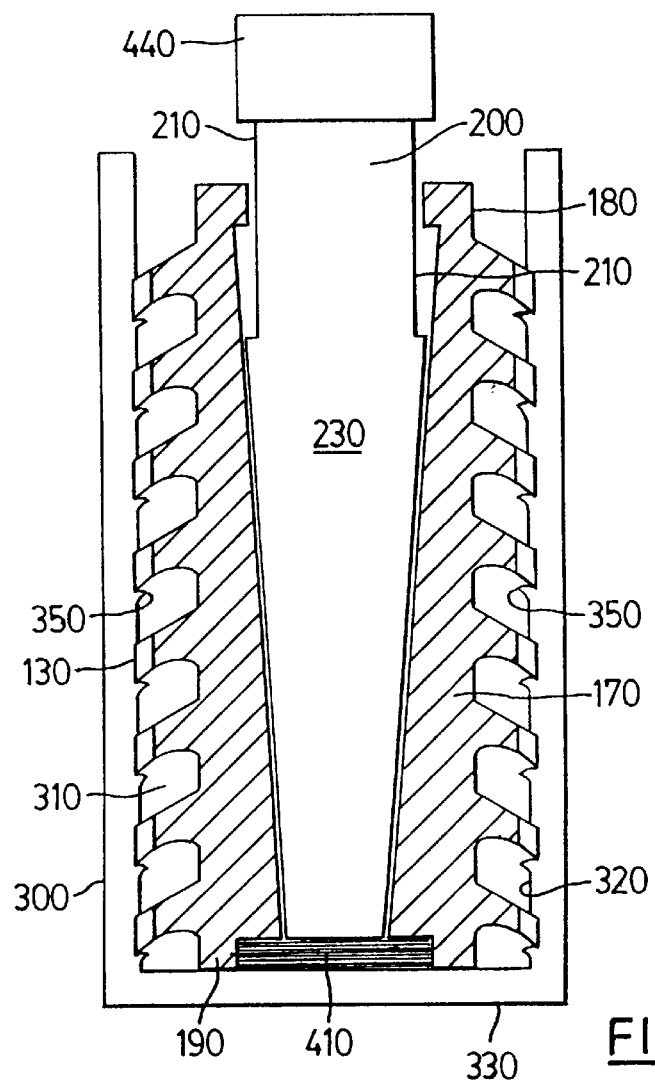
FIG. 3 is a sectional view similar to FIG. 1, showing the tool at the end of a cutting stroke.

FIGS. 1 to 3 show apparatus used to implement a first embodiment of the process of the invention. A plug shaped tool 100 has a plurality of radially projecting cutting elements 130 distributed over an external surface 120 of the tool in a plurality of segmental arrays 110 (see FIG. 2). Each array of cutting elements has elements 130 in the form of teeth which extend radially and axially from the external surface 120 of the tool 100. Each tooth 130 has a tapered axially raked cutting edge 140 and is separated from the adjacent tooth by a profiled recess 135.

The segmental arrays 110 of cutting elements are separated by a plurality of axially-extending slots 160 between the external surface 120 and an internal bore 150. Each alternate slot 160 extends from an opposite end of the tool 100 along most of the length of the tool 100. The axially-extending slots 160 define a plurality of segmental portions 170 each connected at opposite ends to circumferentially adjacent portions 170 so as to render the tool resiliently radially expansible and providing the individual segmental arrays of cutting elements with a capability of some radial movement. In the example shown, the bore 150 is tapered. A tapered plunger 200, when driven into the internal bore 150, acts on inner surfaces 180 of the portions 170 to cause the portions 170 to expand radially outwardly together with their arrays of cutting elements. Axial movement of the plunger 200 in the internal bore 150 changes the diameter of the tool 100 uniformly along the entire length of the tool 100. It should be understood that of the profiles of the bore 150 and of the plunger 200 are exemplary only of mechanisms that may be utilized to expand the tool. For example, the bore and plunger could be complementary tapered polygons or provided with intergaging ribs or grooves to prevent relative rotation of the ports, or the function of their tapers could be replaced by ball bearings between the tool and the plunger, running in longitudinally tapered races. The plunger could be an expansible mandrel of any of various types capable of providing appropriate expansion of the tool. The segments of the tool could also be separately formed and linked in any of various ways.

A socket structure 10 (see FIG. 1) which receives and supports a deep drawn collector can, and a linear actuator 420 is fixedly supported relative to the socket structure 310 for moving the actuator 200 axially into an out of the socket in the socket structure. The axial position of the plunger relative to the actuator is adjustable by means of an adjusting nut 440.

FIG. 1 depicts the tool 100 moved axially so that it is inserted in the internal cavity of a tubular member 300, in this case a can intended to form the collector of a battery cell. To facilitate withdrawal of the tool 100 from the internal cavity as the final step of the process, the tool 100 has an internal collar 180 at the upper end of its internal bore 150, and the actuator 200 is formed with a shoulder 210 for engaging the collar, between a stem 220 and a body 230 of the actuator.

The process for treating the internal tubular surface 320 of the can 300 using the tool will now be described. The can 300, which is typically deep drawn from ductile material, and has an internal tubular surface 320, is placed in a socket of the socket structure 310 while the actuator 420 has been operated to withdraw the plunger 200 carrying the tool 100 above the structure 310 to enable the can to be inserted therein. In an alternative arrangement, the socket structure might have laterally separable portions so that the can may be inserted or removed laterally. As shown in FIG. 1, the plunger 200 is sufficiently withdrawn from the internal bore 150 that the shoulder 210 contacts the collar 180, and the diameter of the unexpanded tool 100 is less than the internal diameter of the tubular member 300. The tool 100 is then inserted into the interior cavity 310 by extending the actuator 420 to the position shown in FIG. 1 such that a base 190 of the tool is initially separated from the base 330 of the can by a gap 400. A spring 410 attached to the base 190 of the tool contacts the base 330 at this point.

Further downward movement of the plunger 200 by the actuator 420 causes the spring 410 on the base of the tool to restrain the latter so that the plunger moves into the tool and expands its segmental portions so as to move the arrays of cutting elements into contact with the inner surface of the can, causing the cutting elements 130 to penetrate the internal tubular surface 320 into the ductile material comprising the tubular member 300. The shape of the actuator body 230 and the size of the gap 400 are selected so that the teeth 130 penetrate the ductile material to a depth substantially less than the thickness of the tubular member 300 so that there can be no penetration of the can. Due to the axial force applied to the tool by the plunger, the tool 100 will also move in the direction of actuation of the plunger. This axial movement of the tool will be resisted by the spring 410 while the elements 130 penetrate the internal tubular surface 320. At this point the adjusting nut 440 contacts the collar 210 and drives the tool downward against the force of the spring 410 until the tool contacts the base portion 330 of the tubular member 300. Typically, there will be a transition from radial and axial motion of the tool to purely axial motion, but the cutting stroke is primarily axial although it may have a radial component. The cutting elements 110 already embedded in the wall of the tubular member are thus driven through a cutting stroke, parallel to the internal tubular surface 320 with a planing action which lifts portions 350 of the ductile material inwardly from the internal tubular surface 320 to form undetached tapered shavings 350 which move into the profiled recesses 135 between the teeth. The rake of the teeth and the profile of the recesses 135 are selected to provide a proper planing action upon the ductile material of the can. It will be noted that the shavings formed by the undetached lifted portions of the can material present surfaces facing both towards and away from the inner surface of the can, the surface area of the lifted portions being additional to that of the inner surface, whose own area is increased by the grooves from which the shavings are lifted.

The actuator 420 is then operated to raise the plunger 200. Initially the spring 410 will raise the tool with the plunger, and then the plunger will withdraw from the tool until the shoulder 210 contacts the collar 180. This reverses the downward motion of the tool, withdrawing the teeth from the shavings and the tool from the inner surface of the can so that the tool may be withdrawn from the can without damaging or detaching the shavings. The can may then be removed from the socket structure 310, possibly with the aid of a plunger 460, and the process repeated with another can.

Figure 4:
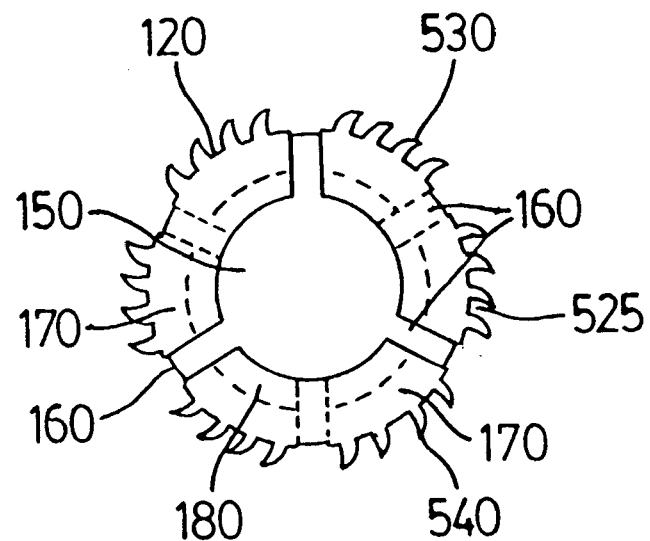
FIG. 4 is a schematic end view of a tool used in an alternative embodiment of the apparatus.
Figure 5:
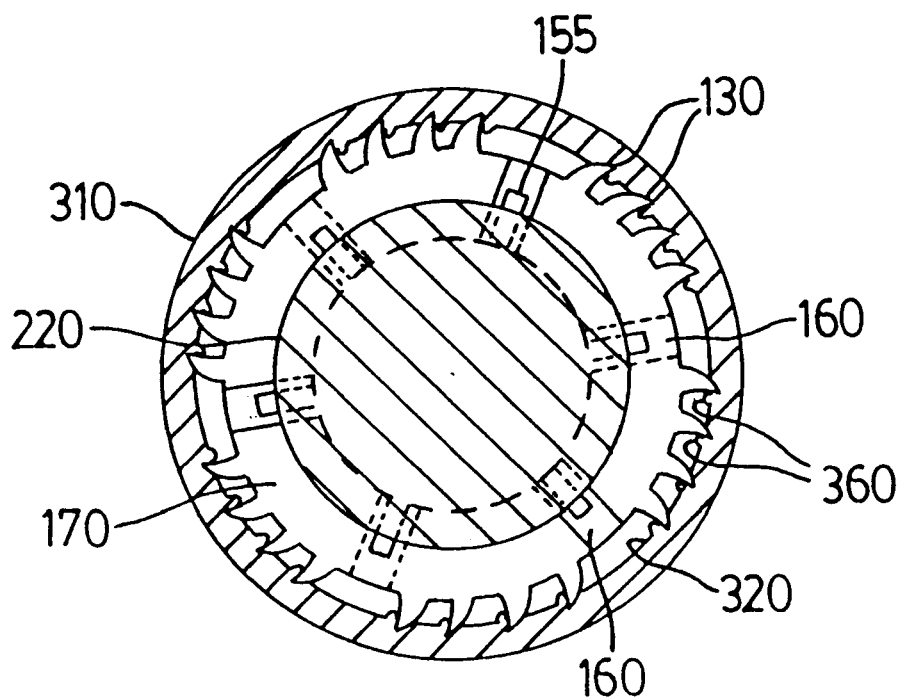
FIG. 5 is a cross-sectional view of the tool depicted in FIG. 4, within a collector can and at the end of a cutting stroke.

In a modification of the preceding embodiment, a modified tool 100 is utilized, and the spring 410 is dispensed with as shown in FIGS. 4 and 5. The actuator 420 provides both axial and rotary motion of the plunger, which is provided with keys 155 entering the slots 160 so as to ensure conjoint rotary motion of the plunger and the tool. The teeth 130, instead of being raked downwardly are raked circumferentially as shown in FIG. 5, and the circumferential openings 120 between them are profiled similarly to the openings 135 in the previous embodiment. In the present embodiment, the tool is expanded by the plunger so that the teeth 130 penetrate the inner surface of the can, as previously described, and the plunger and tool are then rotated through a limited angle in the direction of rake of the teeth 130 so as to produce shavings as previously described. The cutting motion is thus primarily circumferential, but because of overlap between the surface penetration and cutting phases, there may be radial and axial components. During withdrawal of the tool, the plunger is first rotated back to its original position, and then withdrawn so as first to allow the tool to retract, and then to withdraw it from the can. Rather than rotating the plunger, it would be possible to rotate the socket in which the can is held. The can must be held sufficiently tightly during the rotation step that it rotates relative to the tool rather than the socket. In both this and the preceding embodiment, it would be possible to move the socket relative to the plunger rather than vice-versa.

Figure 6:
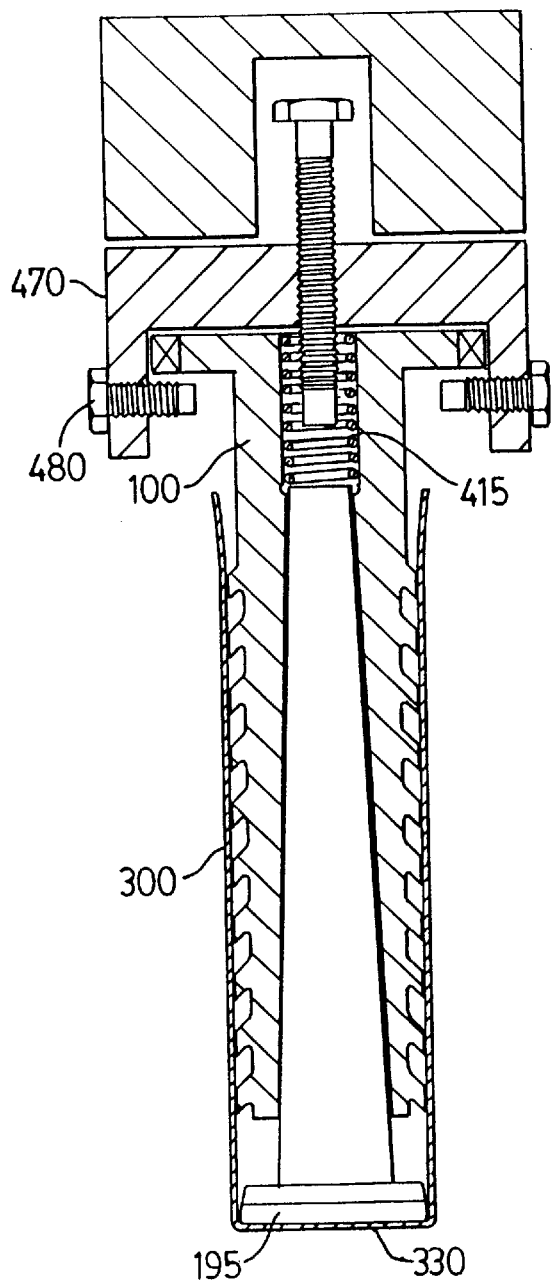
FIG. 6 is a schematic sectional view of a further embodiment of apparatus in accordance with the invention.

Instead of the actuator being connected to the plunger as in the preceding embodiments, the tool 100 may be connected to the actuator as shown in FIG. 6, with the plunger 200 oppositely tapered. The tool 100 is secured in a tool holder 470 connected to an actuator, by means of set screws 480. The plunger 200 is pressed downwardly relative to the tool, which is similar to that of the first embodiment, by a spring 415, while the movement of the plunger into the tool, and thus the expansion of the tool, is limited by an adjusting screw 445 beneath a cover attached to the holder 470. At the base of the plunger 200 is mounted a stack 195 of elastomeric washers. Operation is essentially similar to that of the first embodiment, except that the tool is pressed onto the plunger to expand it once the stack 195 contacts the base 330 of the can 300, against the pressure of the spring 415, and the tool once expanded is moved through its cutting stroke again the pressure of the elastomeric washers. The spring 415 and washers also control relative movement of the parts during withdrawal of the tool so as to avoid damage to the portions raised from the inside surface of the can.

Figure 7:
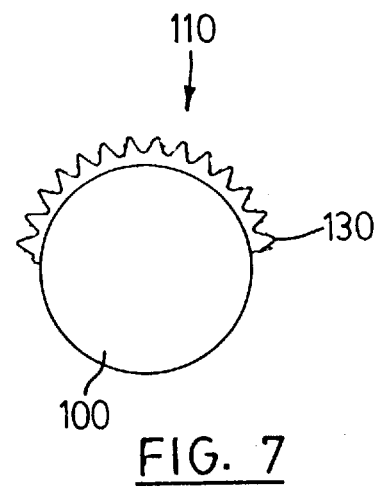
FIG. 7 is a schematic cross-sectional view of a tool for use in yet a further embodiment of the invention.
Figure 8:
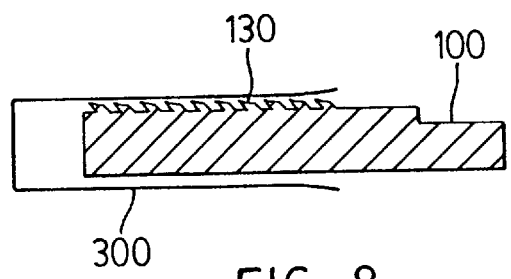
FIG. 8 is a diagrammatic longitudinal sectional view of the tool within a can.

In the embodiments described above, the tools have multiple segmental portions each with an array of cutting elements, and each operated simultaneously. It is however also possible and may be preferred to utilize a tool such as that shown in FIG. 7 having only a single segmental array 110 of cutting elements 130, and to perform multiple sequential processing sequences, with the tool 100 and the can 300 being rotated relative to one another between each sequence. Thus for a cylindrical can, the array of cutting elements might extend through 120° or 180° (as shown) with the can being rotated through a similar angle between each of three or two processing sequences. For example, the process could be carried out on a lathe type apparatus, with the can being held in a chuck, and the segmental tool being mounted on a tool holder performing the required sequences of axial and radial movements relative to the chuck under program control, with the chuck being rotated between each sequence. The movements of the tool holder would be such as to duplicate those of a single segment of the tool in the first and third embodiments described above. Provided that the tool can be moved clear of the can by radial movement after a cutting stroke, it will not be necessary to withdraw the tool fully from the can after each cutting stroke.

In each of the foregoing embodiments, cutting edges of the cutting elements may be of various configurations depending on the form of shaving to be lifted from the surface, and the profiles of the recesses into which the shavings are cut must be profiled to a curvature which the shaving can follow without breakage, and from which the shaving can disengage on the return stroke of the tool.

In the manufacture of battery cells, the processed cans would be packed with a layer of active material against the inner surface of the can side wall. Because of the configuration of the raised portions of the inner surface of the can forming the collector of a battery cell, these portions will not only extend into the active material, typically a mixture of manganese dioxide and graphite in an alkaline manganese cell, but will mechanically bond and electrically couple the active material to the side wall. The composition of the active material will of course depend on the type of battery cell being manufactured.

Although the embodiments described produce raised portions from the sidewall by axial or circumferential planing cuts, other cutting techniques are possible. For example, ploughshare-like cutting elements could be used to turn furrows in the material, or other tool configurations could be used to plough out raised portions of the sidewall material providing surfaces facing both towards and away from the wall. Furthermore, although the invention has been specifically described in respect of the processing of tubular cans forming the collectors of battery cells, similar techniques could be applied to other tubular workpieces formed from ductile material.

Commonly used battery cells such as hose of the AA, AAA, C and D sizes use cylindrical collector cans. It should be appreciated however that at least those embodiments of the invention using axial cutting strokes may be applied to cans of other tubular cross sections such as rectangular, other polygonal, or elliptical.

I claim:

1. A process for forming an internal tubular surface of a tubular collector can for a battery cell formed of conductive ductile material with an at least one array of plural segments, the process comprising, for each of an array of plural segments formed on the internal tubular surface, performing an operating cycle comprising moving a tool having a segmental array of radially outward extending cutting elements axially into the can; moving the tool radially outwards to drive the cutting elements into the material of the collector can without penetrating through the can, and driving the tool through a cutting stroke having at least one of axial and rotational components such that the cutting elements cut and deform the material to raise discrete portions of the material of the collector out of said surface, to positions presenting additional surfaces facing both towards and away from said internal tubular surface, without detaching said portions from the surface thus forming said at least one array of plural segments within the collector can; and withdrawing the tool from the collector without detaching said discrete portions.

2. A process according to claim 1, wherein the tool has plural segmental arrays of cutting elements arrayed in a ring and radial movement of the arrays is obtained by expanding and contracting the ring.

3. A process according to claim 1, wherein the tool has a single segmental array which performs plural operating cycles sequentially, the collector and the tool being relatively rotated between cycles.

4. A process according to claim 1, wherein the cutting stroke is primarily axial.

5. A process according to claim 1, wherein the cutting stroke is primarily circumferential.

6. A process according to claim 1, wherein the cutting elements are configured to perform planing cuts, and the cutting stroke is short enough before the tool is withdrawn that shavings produced by the cuts remain attached to the collector.

7. A process according to claim 1, wherein the cutting elements are plough blades configured to turn material out of a furrow cut in the collector by the plough blades without detaching the material turned out of the furrow.

8. Apparatus for forming an internal tubular surface of a tubular collector for a battery cell, comprising a tool having at least one segmental array of cutting elements in a configuration complementary to that of at least one segment of the internal tubular surface to be formed, and means for supporting and relatively moving the tool and a collector to be formed through an operating cycle including an insertion movement in which the tool is inserted axially into the collector, an engagement movement in which the cutting elements of the tool are moved radially to penetrate the internal tubular surface of the collector by no more than part of the thickness of the collector, a cutting movement in which the cutting elements are moved relative to the collector while penetrating its surface so as to cut and deform the material of the internal tubular surface of the collector to displace the material from the collector inwardly of the internal tubular surface without detaching the displaced material such that said displaced material presents additional surfaces facing both towards and away from said tubular internal surface, and a withdrawal movement for moving the tool from the collector.

9. Apparatus according to claim 8, wherein the tool has multiple segmental arrays arranged in a ring, and the means for supporting and relatively moving the tool cuts and deforms the multiple segmental arrays simultaneously in the material of the tubular surface.

10. Apparatus according to claim 9, wherein the tool is annular in form, and is divided between the segmental arrays by slots parallel to its axis and extending alternatively from opposite ends of the annulus.

11. Apparatus according to claim 10, wherein the means for supporting the tool include a profiled plunger, and the movements of the operating cycle are controlled by relative movement between the tool and the plunger.

* * * * *